UNITED STATES PATENT OFFICE.

JENS DEDICHEN, OF BERLIN-HALENSEE, AND WERNER LANGE, OF BERLIN-FRIEDENAU, GERMANY, ASSIGNORS TO ACTIEN GESELLSCHAFT FÜR ANILIN FABRIKATION, OF BERLIN, GERMANY.

BLUE TETRAKISAZO DYES.

1,180,985.  Specification of Letters Patent.  Patented Apr. 25, 1916.

No Drawing.  Application filed November 2, 1915.  Serial No. 59,244.

*To all whom it may concern:*

Be it known that we, JENS DEDICHEN and WERNER LANGE, citizens the former of Norway and the latter of Germany, residing at Berlin - Halensee, Germany, and Berlin-Friedenau, Germany, our post - office addresses being Seesenerstrasse 25, in Berlin-Halensee, Germany, and Feurigstrasse 10, Berlin-Friedenau, Germany, have invented certain new and useful Improvements in Blue Tetrakisazo Dyes, of which the following is a specification.

The object of our invention is new tetrakis-azo dyes, which dye cotton blue and may be treated on the fiber with formaldehyde, thus giving blue dyeings of a good fastness to light and washing.

The dyes correspond to the general formula:

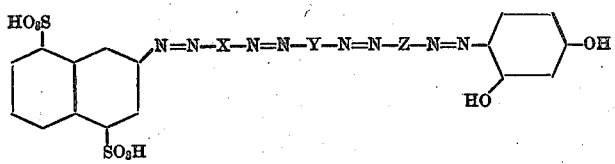

X, Y and Z meaning aromatic radicals.

These dyes in the shape of their alkali metal salts are blackish powders, soluble in water to blue solutions from which hydrochloric acid precipitates violet flocks. They are soluble in concentrated sulfuric acid to blackish solutions, from which the dyes are separated by addition of ice. Strong reducing agents destroy the dyes yielding 2-naphthylamin-4.8-disulfonic acid, aminoresorcinol and diamins corresponding to the middle compounds used for manufacture of the dyes.

The dyes may be manufactured by first combining diazotized 2-naphthylamin-4.8-disulfonic acid with a middle compound capable of being after combination further diazotized, such as 1-naphthylamin, rediazotizing the product thus obtained, combining them with a second molecule of a middle compound, rediazotizing again, combining with a third molecule of a middle compound, rediazotizing once again and combining finally with resorcinol.

As middle compounds the amins, such as 3-toluidin, para-xylidin, 3-amino-4-methoxy-1-methylbenzene, 1-naphthylamin-1-amino-2-naphtholalkylether, as well as sulfonic acids, such as 1-naphthylamin-6- or 7-sulfonic acids, 1-amino-2-naphtholalkylether-6- or 7-sulfonic acids, 2-amino-5-naphthol-7-sulfonic acid more especially are adapted.

To illustrate how the new process may be carried out the following example is given, the parts being by weight.

Example: The diazo compound prepared from 32.5 parts of monosodium salt of 2-naphthylamin-4.8-disulfonic acid is introduced into a solution of 18 parts of 1-naphthylamin-hydrochlorid at a temperature of about 50° C. The combination product is separated by filtration and dissolved in dilute soda-lye and diazotized by the addition of an excess of hydrochloric acid and 7 parts of sodium nitrite. The diazo-azo compound is mixed with a neutral solution of 22.3 p. of 1-naphthylamin-6-sulfonic acid and the free mineral acid neutralized by sodium acetate. The disazo dye is isolated, again dissolved and diazotized in the mentioned manner, filtered and combined with 12.1 parts of para-xylidin, as hydrochloric salt dissolved in water. The trisazo dye is in the form of its sodium salt dissolved in hot water and at 5° C. diazotized by means of nitrite and hydrochloric acid. The diazotization being complete after stirring during three hours, the diazo compound flows into a cold solution of 11 parts of resorcinol with the addition of an excess of sodium carbonate. The tetrakis-azo dye formed is salted out and dried. It corresponds probably to the formula

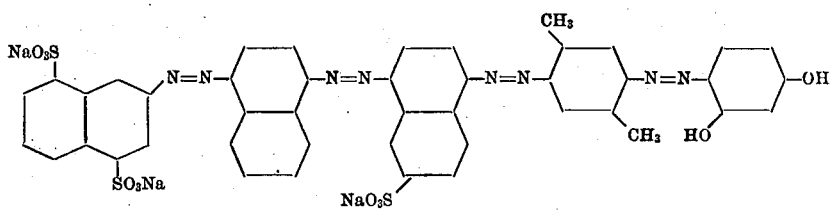

and shows the properties mentioned above. Its reduction-products are 2-naphthylamin-4.8-disulfonic acid, amino-resorcinol, 1.4-diaminonaphthalene, 1.4-diaminonaphthalene-6-sulfonic acid and 2.5-diamino-1.4-xylene.

It is to be understood that the invention is not limited to the above example.

We claim:—

1. The herein described new tetrakisazo dyes of the general formula

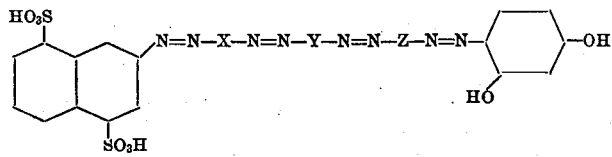

where X, Y and Z mean aromatic radicals, being in the shape of alkali metal salts blackish powders soluble in water to blue solutions, from which hydrochloric acid precipitates violet flocks and from which cotton is dyed blue, soluble in concentrated sulfuric acid to blackish solutions, from which the dyes are separated again by addition of ice, yielding upon reduction 2-naphthylamin-4.8-disulfonic acid, amino-resorcinol, and aromatic diamins.

2. The herein described new tetrakisazo dye of the formula

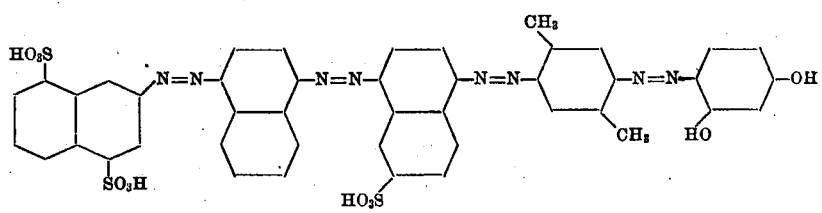

being in the shape of its sodium salt a blackish powder soluble in water to a blue solution, from which hydrochloric acid precipitates violet flocks and from which cotton is dyed blue, soluble in concentrated sulfuric acid to a blackish solution, from which the dye is separated again by addition of ice, yielding upon reduction, 2-naphthylamin-4.8-disulfonic acid, amino-resorcinol, 1.4-diaminonaphthalene, 1-4-diamino-naphthalene-6-sulfonic acid and 2.5-diamino-1.4-xylene.

In testimony whereof we affix our signatures in presence of two witnesses.

JENS DEDICHEN.
WERNER LANGE.

Witnesses:
HENRY HASPER,
ARTHUR SCHROEDER.